United States Patent
Aguilar et al.

(10) Patent No.: US 10,823,003 B2
(45) Date of Patent: Nov. 3, 2020

(54) SYSTEM AND METHOD FOR MITIGATING UNDESIRED VIBRATIONS AT A TURBO MACHINE

(71) Applicant: General Electric Company, Schenectady, NY (US)

(72) Inventors: Eduardo Aguilar, Queretaro (MX); Ravindra Shankar Ganiger, Bangalore (IN); Richard R. Schmidt, Loveland, OH (US)

(73) Assignee: General Electric Company, Schenectady, NY (US)

( * ) Notice: Subject to any disclaimer, the term of this patent is extended or adjusted under 35 U.S.C. 154(b) by 272 days.

(21) Appl. No.: 15/989,869

(22) Filed: May 25, 2018

(65) Prior Publication Data

US 2019/0360357 A1 Nov. 28, 2019

(51) Int. Cl.
| | |
|---|---|
| *F01D 25/16* | (2006.01) |
| *F01D 25/04* | (2006.01) |
| *F01D 21/14* | (2006.01) |
| *F16C 25/06* | (2006.01) |

(52) U.S. Cl.
CPC ........... *F01D 25/164* (2013.01); *F01D 21/14* (2013.01); *F01D 25/04* (2013.01); *F16C 25/06* (2013.01); *F05D 2220/323* (2013.01); *F05D 2240/52* (2013.01); *F05D 2260/96* (2013.01); *F05D 2270/62* (2013.01); *F05D 2270/66* (2013.01); *F16C 2233/00* (2013.01); *F16C 2360/23* (2013.01)

(58) Field of Classification Search
CPC ...... F16C 41/02; F16C 25/08; F05D 2240/52; F01D 25/164
See application file for complete search history.

(56) References Cited

U.S. PATENT DOCUMENTS

| | | | |
|---|---|---|---|
| 3,038,765 A | 6/1962 | Tupper | |
| 3,738,719 A * | 6/1973 | Langner | ................ F16C 25/083 384/517 |
| 3,922,852 A * | 12/1975 | Drabek | ..................... F01D 7/00 60/226.1 |

(Continued)

OTHER PUBLICATIONS

U.S. Appl. No. 15/346,202, filed Nov. 8, 2016.

(Continued)

*Primary Examiner* — Eldon T Brockman
(74) *Attorney, Agent, or Firm* — Dority & Manning, P.A.

(57) ABSTRACT

A system for operating a turbo machine to maintain bearing engagement, the system including a bearing assembly; a first displacement device adjacent a bearing race; a second displacement device disposed adjacent the bearing race opposite of the first displacement device; an effort supply system disposed adjacent to the first and/or second displacement devices; and one or more controllers configured to perform operations. The operations include generating a first effort input at the first and/or second displacement devices; adjusting a thrust loading at the bearing assembly; generating a second effort input at the first displacement device greater than the first effort input; and displacing the bearing race opposite of the thrust loading at the bearing assembly via the generated second effort input at the first displacement device.

20 Claims, 6 Drawing Sheets

(56) References Cited

U.S. PATENT DOCUMENTS

| | | | |
|---|---|---|---|
| 4,850,719 A * | 7/1989 | Moseley | F16C 19/184 384/1 |
| 5,051,005 A * | 9/1991 | Duncan | F16C 25/08 384/517 |
| 5,052,828 A | 10/1991 | Ciokajlo et al. | |
| 5,277,281 A | 1/1994 | Carlson et al. | |
| 5,658,125 A | 8/1997 | Burns et al. | |
| 5,836,739 A * | 11/1998 | Haramura | F01D 25/168 415/104 |
| 5,915,513 A | 6/1999 | Isley, Jr. et al. | |
| 5,931,052 A | 8/1999 | Zhao et al. | |
| 5,984,056 A | 11/1999 | Agnihotri et al. | |
| 6,116,784 A | 9/2000 | Brotz | |
| 6,183,386 B1 | 2/2001 | Duggan | |
| 6,260,351 B1 | 7/2001 | Delano et al. | |
| 6,287,074 B1 * | 9/2001 | Chancellor | F04D 13/0646 415/111 |
| 7,018,102 B1 | 3/2006 | Brotz | |
| 7,115,336 B2 | 10/2006 | Revol | |
| 7,138,093 B2 | 11/2006 | McKay et al. | |
| 7,431,504 B1 | 10/2008 | Pelfrey | |
| 7,806,011 B2 * | 10/2010 | Eichenberger | F02N 7/08 123/179.31 |
| 8,205,445 B2 | 6/2012 | Browne et al. | |
| 8,359,744 B2 | 1/2013 | Hislop et al. | |
| 8,413,773 B2 | 4/2013 | Anderfaas et al. | |
| 8,527,247 B1 | 9/2013 | Wilson et al. | |
| 8,662,756 B2 | 3/2014 | Care et al. | |
| 8,702,377 B2 | 4/2014 | Crottrell et al. | |
| 8,727,632 B2 | 5/2014 | Do et al. | |
| 8,814,503 B2 | 8/2014 | McCune et al. | |
| 8,936,660 B2 | 1/2015 | Cruz Aguado | |
| 8,974,344 B2 | 3/2015 | McCune et al. | |
| 9,046,130 B2 * | 6/2015 | Kachinski | F01D 25/16 |
| 9,091,309 B2 | 7/2015 | Battlogg | |
| 9,103,321 B1 | 8/2015 | Bardia | |
| 9,121,305 B2 | 9/2015 | Nicholson | |
| 9,121,448 B2 | 9/2015 | Delgado Marquez et al. | |
| 9,134,072 B2 | 9/2015 | Roisin | |
| 9,239,012 B2 | 1/2016 | McCune et al. | |
| 9,297,310 B2 * | 3/2016 | Giri | F01D 17/105 |
| 9,447,817 B2 | 9/2016 | Gallimore et al. | |
| 9,476,320 B2 | 10/2016 | Savela | |
| 9,500,230 B2 | 11/2016 | Hiller et al. | |
| 9,512,874 B2 | 12/2016 | Hennig | |
| 9,523,422 B2 | 12/2016 | McCune et al. | |
| 9,528,776 B1 | 12/2016 | Roper et al. | |
| 9,546,570 B2 | 1/2017 | Fletcher et al. | |
| 9,562,616 B2 | 2/2017 | Strom et al. | |
| 9,638,062 B2 | 5/2017 | Davis | |
| 9,644,541 B2 | 5/2017 | Morreale et al. | |
| 9,714,584 B2 | 7/2017 | Morris | |
| 9,856,751 B2 | 1/2018 | Duong et al. | |
| 2008/0282820 A1 * | 11/2008 | Eichenberger | F16C 41/02 74/6 |
| 2012/0111024 A1 * | 5/2012 | Kachinski | F01D 25/16 60/805 |
| 2012/0292143 A1 | 11/2012 | Anderfaas et al. | |
| 2014/0109580 A1 * | 4/2014 | Giri | F02C 7/18 60/728 |
| 2015/0217866 A1 | 8/2015 | Spina et al. | |
| 2016/0215760 A1 | 7/2016 | Powell | |
| 2016/0312645 A1 | 10/2016 | Ribarov et al. | |
| 2016/0341070 A1 | 11/2016 | Garcia et al. | |
| 2016/0376984 A1 | 12/2016 | Sheridan | |
| 2017/0009655 A1 | 1/2017 | Savela | |
| 2017/0030223 A1 | 2/2017 | Parry et al. | |
| 2017/0051629 A1 | 2/2017 | Sutherland | |
| 2017/0058697 A1 | 3/2017 | Copeland et al. | |
| 2017/0089353 A1 | 3/2017 | Zhang et al. | |
| 2017/0145855 A1 | 5/2017 | Ganiger et al. | |
| 2017/0175523 A1 | 6/2017 | McCune et al. | |
| 2017/0175581 A1 | 6/2017 | McCune et al. | |
| 2017/0175582 A1 | 6/2017 | McCune et al. | |
| 2017/0234158 A1 | 8/2017 | Savela | |
| 2017/0248191 A1 | 8/2017 | Husband et al. | |
| 2017/0260875 A1 | 9/2017 | McCune et al. | |

OTHER PUBLICATIONS

U.S. Appl. No. 15/967,885, filed May 1, 2018.

Carmignani et al., Design of a novel magneto-rheological squeeze-film damper, Smart Materials and Structures, vol. 15, Institute of Physics Publishing, 2006, pp. 164-170 http://resource.isvr.soton.ac.uk/staff/pubs/PubPDFs/Pub8088.pdf.

Zhu et al, A Magneto-rheological Fluid Squeeze Film Damper for Rotor Vibration Control, pp. 516-522.

Kumar et al., Development of Smart Squeeze Film Dampers for Small Rotors, Procedia Engineering, 144, 2016, pp. 790-800.

Xu, et al., Squeeze flow behaviors of magnetorheological plastomers under constant volume, the Society of Rheology, Inc., 2014, pp. 659-679.

* cited by examiner

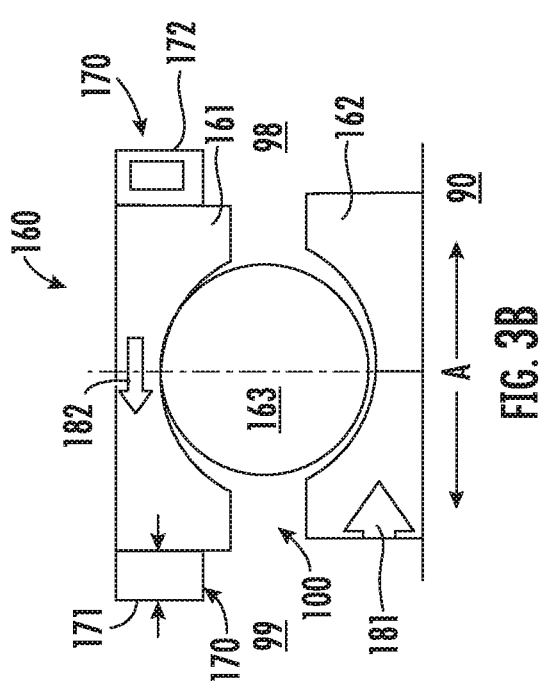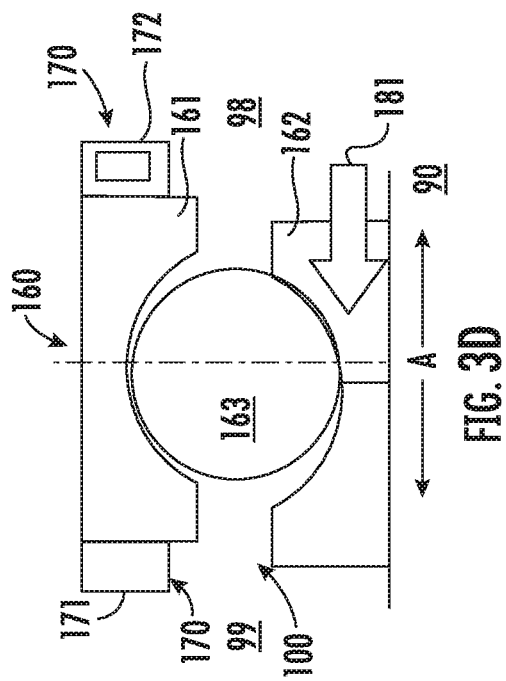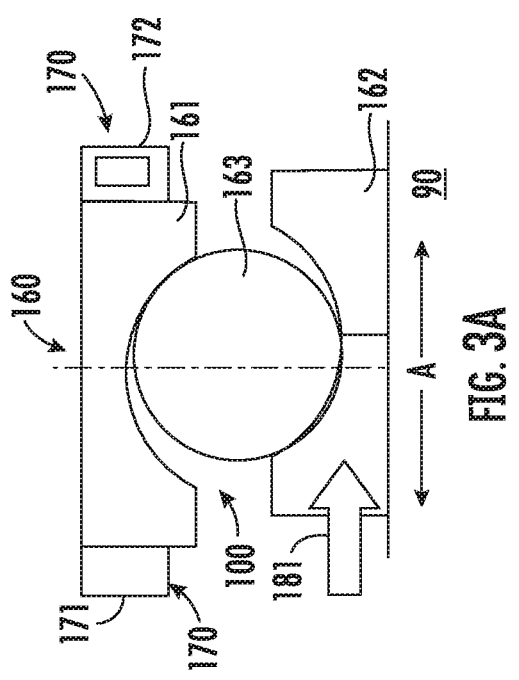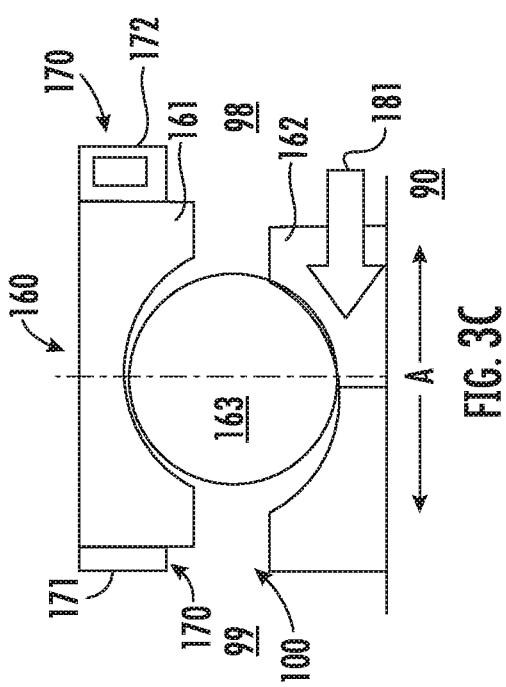

SYSTEM AND METHOD FOR MITIGATING UNDESIRED VIBRATIONS AT A TURBO MACHINE

FIELD

The present subject matter relates generally to systems and methods for mitigating undesired vibrations at a turbo machine via adjusting stiffness at a bearing assembly.

BACKGROUND

Turbo machines, such as gas and steam turbine engines, are supported in part by a thrust bearing, such as a ball bearing, which provides a necessary restraining of motion along an axial direction as well as stiffness along a radial direction. Sufficient stiffness is necessary to avoid undesired non-synchronous vibrations (NSV) or synchronous vibrations during unbalance events such as bowed rotor starts (BRS). Ball bearings require loading along the axial direction to sufficiently engage the ball bearing element into the bearing race to produce a desired stiffness along the radial direction.

However, in various operating conditions of the turbo machine, axial loading (e.g., rotor thrust) is insufficiently present, thereby insufficiently engaging the ball bearing element into the bearing race, which thereby fails to produce the desired stiffness along the radial direction. Insufficient stiffness enables undesired vibrations due to BRS or NSV.

As such, there is a need for systems and methods for providing sufficient stiffness at the bearing assembly to mitigate undesired vibrations due to BRS or NSV.

BRIEF DESCRIPTION

Aspects and advantages of the invention will be set forth in part in the following description, or may be obvious from the description, or may be learned through practice of the invention.

A system for operating a turbo machine to maintain bearing engagement, including a bearing assembly including an inner race, an outer race, and a rolling bearing element; a first displacement device adjacent to one or more of the races; a second displacement device disposed adjacent to one or more races opposite of the first displacement device; an effort supply system disposed adjacent to one or more of the first and/or second displacement devices; a sensor configured to acquire and transmit an operational parameter of the bearing assembly; and one or more controllers configured to perform operations. The operations include generating a first effort input at the first and/or second displacement devices; adjusting a thrust loading at the bearing assembly; generating a second effort input at the first displacement device greater than the first effort input; and displacing one or more of the races opposite of the thrust loading at the bearing assembly via the generated second effort input at the first displacement device.

In various embodiments, the displacement device includes a shape memory alloy material. In one embodiment, the displacement device includes the shape memory alloy defining a two-way memory effect.

In another embodiment, the displacement device comprises a piezoelectric material.

In yet another embodiment, the displacement device defines a substantially cylindrical body adjacent to one or more of the inner race or the outer race of the bearing assembly.

In still another embodiment, the system further includes a spring disposed adjacent to one or more of the inner race or the outer race of the bearing assembly. The spring is disposed on an opposite side of the inner race or the outer race relative to the displacement device.

In one embodiment, the axial direction is co-linear to a thrust load path of the turbo machine, and wherein the displacement device is adjacent to one or more of the outer race or the inner race along the thrust load path.

In various embodiments, the system further includes an effort supply system disposed adjacent to the displacement device. The effort supply system provides an electrical signal or a thermal input to the displacement device. In one embodiment, the effort supply system defines a slip ring providing the electrical signal to the displacement device. In another embodiment, the effort supply system defines a lubricant system providing the thermal input defining a lubricant to the displacement device.

The present disclosure is further directed to a system for operating a turbo machine to maintain bearing engagement. The system includes a bearing assembly including an inner race, an outer race, and a rolling bearing element therebetween; a first displacement device disposed adjacent to one or more of the inner race or the outer race of the bearing assembly, in which the first displacement device displaces the outer race or the inner race along an axial direction; a second displacement device disposed adjacent to one or more of the inner race or the outer race of the bearing assembly opposite of the first displacement device along the axial direction, in which the first displacement device displaces the outer race or the inner race along the axial direction opposite of the first displacement device; an effort supply system disposed adjacent to one or more of the first displacement device or the second displacement device, in which the effort supply system is configured to provide an electrical signal or a thermal input to the first displacement device or second displacement device; a sensor configured to acquire and transmit an operational parameter of the bearing assembly; and one or more controllers including one or more processors and one or more memory devices, the one or more memory devices storing instructions that when executed by the one or more processors cause the one or more processors to perform operations. The operations include generating, via the effort supply system, a first effort input at the first displacement device or the second displacement device; adjusting, via the turbo machine, a thrust loading at the bearing assembly; generating, via the effort supply system, a second effort input at the first displacement device greater than the first effort input; and displacing the outer race or the inner race along the axial direction opposite of the thrust loading at the bearing assembly via the generated second effort input at the first displacement device.

In one embodiment, the operations further include operating the turbo machine at one or more thrust loadings corresponding to a rotor speed greater than or equal to a minimum steady state condition and less than a maximum steady state condition.

In various embodiments, the operations further include determining a change in thrust loading direction based at least on the adjusted thrust loading at the bearing assembly. In one embodiment, generating the second effort input at the first displacement device is based at least on the determined change in thrust loading.

In still various embodiments, the operations further include adjusting at the first displacement device, via the effort supply system, a stiffness at the first displacement device. In one embodiment, the operations further include generating at the first displacement device, via the second effort input provided from the effort supply system, a second stiffness at the first displacement device different from a first stiffness at the first displacement device greater.

Another aspect of the present disclosure is directed to a method for mitigating undesired vibrations at a turbo machine. The method includes generating a first effort input at a first displacement device and a second displacement device adjacent to a bearing assembly; adjusting a thrust loading at the bearing assembly;

generating a second effort input at the first displacement device greater than the first effort input; and displacing an outer race or an inner race along an axial direction opposite of the thrust loading at the bearing assembly via the generated second effort input at the first displacement device.

In various embodiments, the method further includes adjusting at the first displacement device a stiffness at the first displacement device. In one embodiment, the method further includes generating at the first displacement device a second stiffness at the first displacement device different from a first stiffness at the first displacement device greater.

In another embodiment, the method further includes determining a change in thrust loading direction based at least on the adjusted thrust loading at the bearing assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 3A-3D are schematic cross sectional views of a system for controlling stiffness at a bearing assembly according to an aspect of the present disclosure;

Figure 1:
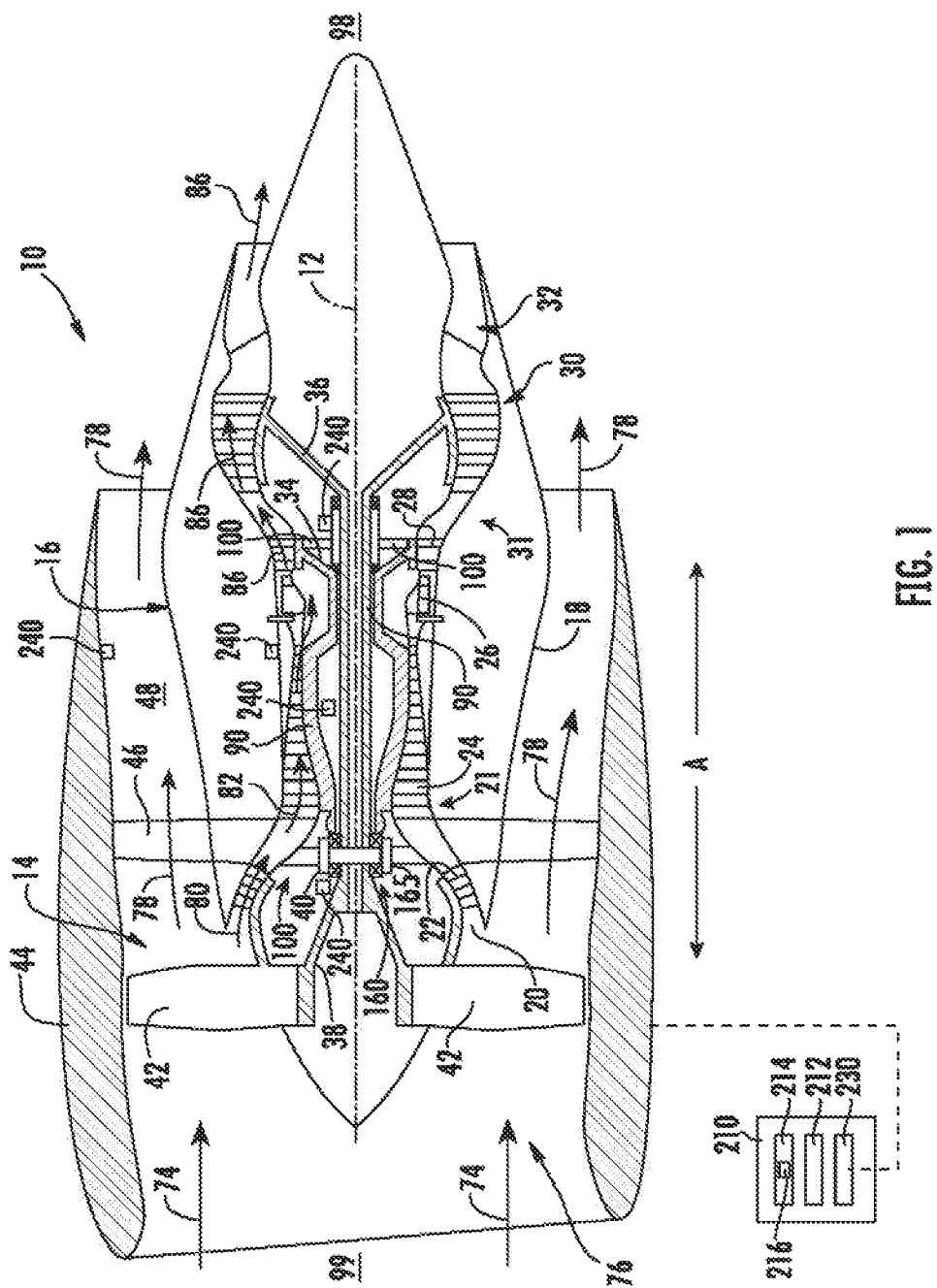
FIG. 1 is a schematic cross sectional view of an exemplary turbo machine according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Systems and methods for providing sufficient stiffness at the bearing assembly to mitigate undesired vibrations due to bowed rotor starts (BRS) or non-synchronous vibrations (NSV) are generally provided. Embodiments of the systems and methods generally shown and described herein that generates a sufficient loading at one or more bearing races such as to displace the bearing race toward the rolling bearing element. In various embodiments of the systems and methods generally provided herein, a first bearing race (e.g., an inner bearing race) is loaded against the rolling bearing element along a first thrust load direction (e.g., along an axial direction). A second bearing race (e.g., an outer bearing race) is loaded against the rolling bearing element along a second thrust load direction opposite of the first thrust load direction. The second bearing race is loaded against the rolling bearing element via a displacement device, such as a spring or actuator defining a shape memory alloy or a piezoelectric device. An effort variable, such as thermal energy or electrical input or current, is provided to the displacement device to adjust loading against the second bearing race based on a thrust output from the turbo machine. The effort variable may further be adjusted based on a change in thrust output from the turbo machine, such as corresponding to a BRS or NSV condition. In various embodiments, mitigating the NSV condition corresponds to a thrust cross over at a rotor assembly of the turbo machine (i.e., a thrust load direction at the rolling bearing element changes from a first direction to a second direction opposite of the first direction).

Referring now to the drawings, FIG. 1 is a schematic partially cross-sectioned side view of an exemplary gas turbine engine 10 herein referred to as "engine 10" as may incorporate various embodiments of the present invention. Although generally depicted herein as a turbofan configuration, the engine 10 shown and described herein may further define a turboprop or turboshaft configuration. As shown in FIG. 1, the engine 10 has a longitudinal or axial centerline axis 12 that extends there through for reference purposes. In general, the engine 10 may include a fan assembly 14 and a core engine 16 disposed downstream of the fan assembly 14.

The core engine 16 may generally include a substantially tubular outer casing 18 that defines an annular inlet 20. The outer casing 18 encases or at least partially forms, in serial flow relationship, a compressor section 21 having a booster or low pressure (LP) compressor 22, a high pressure (HP) compressor 24, or one or more intermediate pressure (IP) compressors (not shown) disposed aerodynamically between the LP compressor 22 and the HP compressor 24; a combustion section 26; a turbine section 31 including a high pressure (HP) turbine 28, a low pressure (LP) turbine 30, and/or one or more intermediate pressure (IP) turbines (not shown) disposed aerodynamically between the HP turbine 28 and the LP turbine 30; and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. In other embodiments, an IP rotor shaft drivingly connects the IP turbine to the IP compressor (not shown). The LP rotor shaft 36 may also, or alternatively, be connected to a fan shaft 38 of the fan assembly 14. In particular embodiments, such as shown in FIG. 1, the LP shaft 36 may be connected to the fan shaft 38 via a power or reduction gear assembly 40 such as in an indirect-drive or geared-drive configuration.

Combinations of the compressors 22, 24, the turbines 28, 30, and the shafts 34, 36, 38 each define a rotor assembly 90 of the engine 10. For example, in various embodiments, the LP turbine 30, the LP shaft 36, the fan assembly 14 and/or the LP compressor 22 together define the rotor assembly 90 as a low pressure (LP) rotor assembly. The rotor assembly 90 may further include the fan rotor 38 coupled to the fan assembly 14 and the LP shaft 36 via the gear assembly 40. As another example, the HP turbine 28, the HP shaft 34, and the HP compressor 24 may together define the rotor assembly 90 as a high pressure (HP) rotor assembly. It should further be appreciated that the rotor assembly 90 may be defined via a combination of an IP compressor, an IP turbine, and an IP shaft disposed aerodynamically between the LP rotor assembly and the HP rotor assembly.

In still various embodiments, the rotor assembly 90 further includes a bearing assembly 160 enabling rotation of the shaft (e.g., shaft 34, 36, 38) relative to a surrounding grounding or static structure (e.g., outer casing 18), such as further shown and described in regard to FIGS. 2-3. The bearing assembly 160 includes a first race defining an outer bearing race 161, a second race defining an inner bearing race 162, and a rolling bearing element 163 disposed therebetween. In various embodiments, the first race may define the outer bearing race 161, in which the first race defining the outer bearing race 161 is coupled to a static structure or bearing housing 165. The second race may define an inner bearing race 162, in which the second race defining the inner bearing race 162 is coupled to the rotor assembly 90. The rolling bearing element 163 may define a thrust bearing generally, such as a ball bearing.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Referring back to FIG. 1, the engine 10 may further include a controller 210. In general, the controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions. In various embodiments, the controller 210 may be configured to actively adjust or modulate a stiffness at the bearing assembly 160 and rotor assembly 90 via displacing an outer race 161, an inner race 162, or both, to engage a rolling bearing element 163 (FIGS. 2-3).

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations such as described in regard to FIGS. 2-6 and outlined in regard to FIG. 7.

Additionally, as shown in FIG. 1, the controller 210 may also include a communications interface module 230. In various embodiments, the communications interface module 230 can include associated electronic circuitry that is used to send and receive data. As such, the communications interface module 230 of the controller 210 can be used to receive data from the rotor assembly 90, the gear assembly 40, the bearing assembly 160, or a sensor 240 proximate or attached thereto providing an operational parameter, such as a vibrations measurement (e.g., an accelerometer, a proximity probe, a displacement probe, etc.), stress or strain (e.g., a strain gage), thrust output (e.g., calculated via engine pressure ratio or rotor speed), or applied load (e.g., a load cell), pressure (e.g., a pressure transducer), or rotational speed (e.g., a 1/rev signal, a tachometer, or other speed detection device proximate to the rotor assembly 90). In addition, the communications interface module 230 can also be used to communicate with any other suitable components of the engine 10, including any number of sensors 240 configured to monitor one or more operating parameters of the engine 10.

It should be appreciated that the communications interface module 230 can be any combination of suitable wired and/or wireless communications interfaces and, thus, can be communicatively coupled to one or more components of the engine 10 (e.g., the system 100, the bearing assembly 160, the rotor assembly 90, the outer casing 18, the nacelle 44, etc., or sensors 240 distributed there throughout) via a wired and/or wireless connection. As such, the controller 210 may communicate with one or more sensors 240 or an effort supply system 200 (FIGS. 2-3) to adjust or displace positioning of the outer race 161, the inner race 162, or both, to load or engage the rolling bearing element 163 to improve stiffness at the bearing assembly 160.

During operation of the engine 10, as shown in FIGS. 1-3 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26.

Referring still to FIGS. 1-3 collectively, the combustion gases 86 generated in the combustion section 26 flows to the HP turbine 28 of the turbine section 31, thus causing the HP shaft 34 to rotate, thereby supporting operation of the HP compressor 24. As shown in FIG. 1, the combustion gases 86 are then routed to the LP turbine 30, thus causing the LP shaft 36 to rotate, thereby supporting operation of the LP compressor 22 and rotation of the fan shaft 38. The combustion gases 86 are then exhausted through the jet exhaust nozzle section 32 of the core engine 16 to provide propulsive thrust.

Referring now to FIG. 2, a system 100 for engagement of the bearing assembly 160 at the engine 10 is generally provided. The system 100 includes a bearing assembly 160 including an inner race 162, an outer race 161, and a rolling bearing element 163 disposed between the races 161, 162. The system 100 further includes a displacement device 170 disposed adjacent to one or more of the inner race 162 or the outer race 161 of the bearing assembly 160. The displacement device 170 displaces the outer race 161 or the inner race 162 along an axial direction A.

More specifically, the displacement device 170 may displace the bearing race coupled to the static structure along the axial direction A such as to further engage the bearing race to the rolling bearing element. For example, the system 100 may displace the outer race 161 of the bearing assembly 160 via embodiments of the displacement device 170 shown and described herein such as to further engage the outer race 161 to the rolling bearing element 163 during thrust cross over or bowed rotor start (BRS). Although the system 100 and methods 1000 described herein may be described in regard to the outer race 161 being displaced along the axial direction A toward the rolling bearing element 163, it should be appreciated that the system 100 may be applied to the inner race 162 such as to further engage the inner race 162 to the rolling bearing element 163 during thrust cross over or BRS.

In various embodiments, the displacement device 170 includes a shape memory alloy material. For example, the displacement device 170 generally includes a material configured to define a first shape based on a first operational mode of the engine 10 and a second shape (different from the first shape) based on a second operational mode of the engine 10 different from the first operational mode. The shape memory alloy generally returns to and from the first shape and the second shape as the operational mode changes. As such, in one embodiment, the displacement device 170 includes the shape memory alloy defining a two-way memory effect. In still various embodiments, the displacement device 170 defining the shape memory alloy includes, but is not limited to, nickel, titanium, zinc, copper, gold, or iron, or combinations thereof.

In various embodiments, the displacement device 170 including the shape memory alloy expands or contracts along the axial direction A based on a signal defining a thermal energy input. As such, the displacement device 170 may generally define an actuator or spring applying a force or load along the axial direction A onto the outer race 161, the inner race 162, or both, of the bearing assembly 160. The applied load displaces one or more of the bearing races 161, 162 such as to promote engagement or contact of the race 161, 162 onto the rolling bearing element 163. Additionally, or alternatively, the displacement device 170 may generally define an actuator or spring contracting or compressing in response to an applied force or load along the axial direction A, such as to enable displacement of the outer race 161, the inner race 162, or both along the axial direction A, such as further shown and described in regard to FIGS. 2-3.

In another embodiment, the displacement device 170 includes a piezoelectric material. For example, the displacement device 170 may generally define a piezoelectric actuator configured to expand or contract along the axial direction A based on a signal defining an electrical charge. As such, the displacement device 170 may generally define an actuator or spring applying a force or load along the axial direction A onto the outer race 161, the inner race 162, or both, of the bearing assembly 160 or compressing in response to an applied load, such as described above. In various embodiments, the displacement device 170 may include, but is not limited to, a piezoelectric material including a piezoelectric crystal, a piezoelectric ceramic, or a piezoelectric polymer. In still various embodiments, the displacement device 170 may include, but is not limited to, langasite, gallium orthophosphate, lithium niobate, lithium tantalite, barium titanate, lead titanate, lead zirconate, lead zirconate titanate, potassium niobate, sodium tungstate, $Ba_2NaNb_5O_5$, $Pb_2KNb_5O_{15}$, zinc oxide, polyvinyfluoride, polyvinylidene fluoride, porous polypropylene, fluoroethylenepropylene, polytetrafluoroethylene, cellular cycloolefines, cellular polyethylene terephthalate, or combinations thereof.

In still another embodiment (not shown), a plurality of the displacement device 170 may be disposed in adjacent arrangement (e.g., adjacent arrangement along the axial direction A) such as to define a plurality of actuators or springs in serial arrangement applying a force or load at the race 161, 162. For example, two or more of the plurality of displacement devices 170 may define a combination of piezoelectric and shape memory alloy materials. As another example, two or more of the plurality of displacement devices 170 may define combinations of piezoelectric and/or shape memory alloy materials.

Referring still to FIGS. 1-3, it should be appreciated that the axial direction A is substantially co-linear to a thrust load path of the engine 10. For example, during operation of the engine 10 such as generally depicted in regard to FIG. 1, the rotor assembly 90 is generating thrust substantially along the axial direction A. As such, the displacement device 170 may be disposed more specifically adjacent to one or more of the outer race 161 or the inner race 162 along the thrust load path.

Referring to FIGS. 1-2, during operation of the engine 10, such as described above, the propulsive thrust produced by the engine 10 shifts or displaces the rotor assembly 90 along the axial direction A. The direction along the axial direction A to which the rotor assembly 90 shifts changes based at least on an operating mode of the engine 10.

In various embodiments, the engine 10 further includes an effort supply system 200. The effort supply system 200 provides an electrical signal or a thermal input to the displacement device 170, such as shown schematically at arrows 201. In one embodiment, the effort supply system 200 defines an electromechanical device that allows transmission of an electrical signal to a rotary structure (e.g., a slip ring). For example, the effort supply system 200 may include a generally stationary or non-rotating unit providing or receiving the electrical signal to a rotating unit disposed adjacent to adjacent to the displacement device 170 disposed adjacent to the inner race 162 coupled to the rotor assembly 90, such as shown and further described in regard to FIG. 4.

In another embodiment, the effort supply system 200 defines a lubricant system providing the thermal input defining a lubricant to the displacement device 170. For example, the effort supply system 200 may define a lubricant system providing lubricant of varying temperatures based on a desired actuation of the displacement device 170 to one or more of the races 161, 162. The desired actuation of the displacement device 170 to one or more of the races 161, 162 further displaces the races 161, 162 such as to provide or improve engagement or contact of one or more of the races 161, 162 to the rolling bearing element 163. As such, engagement, or improved engagement of the races 161, 162 to the rolling bearing element 163 improves rotor assembly 90 loading to the surrounding static structure or bearing housing 165 throughout changes in operating mode of the engine 10 to mitigate the occurrence of BRS and/or NSV.

Figure 2A:
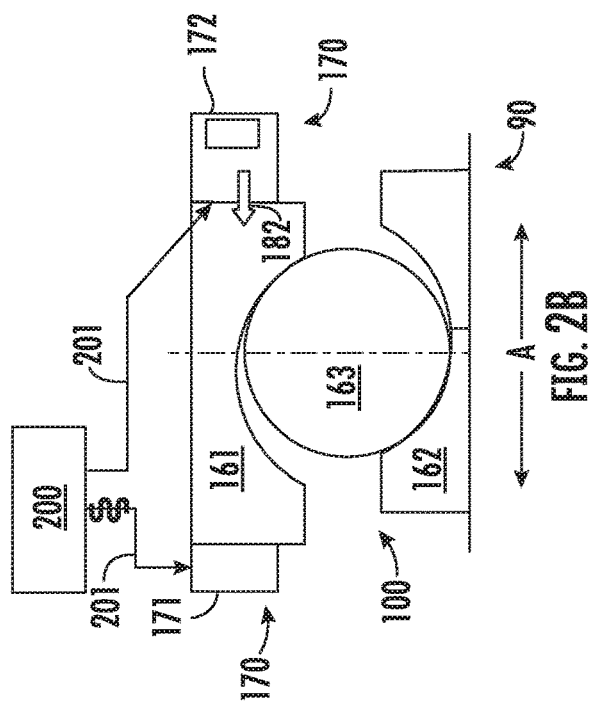
FIGS. 2A-2D are schematic cross sectional views of a system for controlling stiffness at a bearing assembly according to an aspect of the present disclosure.

For example, referring to FIGS. 2A-2D, the rotor assembly 90, and the inner race 162 attached thereto, may shift along the axial direction A based on an operating mode of the engine 10. Referring to FIG. 2A, the bearing assembly 160 may define a gap 140 when the engine 10 defines a low thrust operating mode. Referring briefly to an exemplary graph 600 depicting operation of the system 100 over changes in engine operating mode, the graph 600 includes a time axis 601, a bearing stiffness axis 602, and an engine output axis 603. The engine output axis 603 generally corresponds to the engine operating modes described herein. In one embodiment, the engine output axis 603 may define a rotational speed of the rotor assembly 90 (FIG. 1). In another embodiment, the engine output axis 603 may define a thrust output of the engine 10. The graph 600 generally includes an engine output curve 615 and a bearing stiffness curve 625 versus change in time 601 during engine operation. In various embodiments, the low thrust operating mode may define a minimum steady state operating condition or lower (e.g., a minimum fuel and oxidizer flow rate to sustain substantially zero acceleration rotation of the rotor assembly 90), such as depicted at time portion 610 of the graph 600 between the zero RPM (depicted at 606) and the minimum steady state operating condition (depicted at 604). For example, the minimum steady state operating condition may define a ground idle condition at the engine. In various embodiments, the minimum steady state operating condition may define an approximately 30% rotor speed relative to a full load operating condition or aero design point (e.g., depicted at 605 at the graph 600 in FIG. 6).

Figure 6:
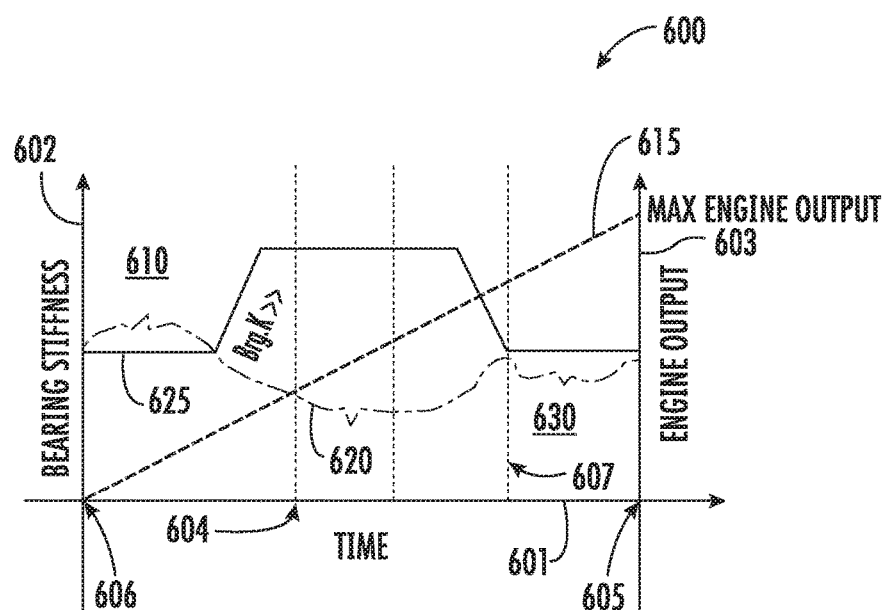
FIG. 6 is an exemplary graph depicting changes in bearing stiffness versus changes in engine operating condition according to an aspect of the present disclosure.

The bearing assembly 160 may be generally insufficiently loaded when the engine 10 is at rest or zero revolutions per minute (RPM), or such as due to a BRS condition, such as to define a gap 140 between the rolling bearing element 163 and one or more of the outer race 161 or the inner race 162, such as depicted in regard to FIG. 2A and exemplified via the graph 600 (FIG. 6). The effort supply system 200 generates and transmits the electrical or thermal signal (e.g., via the controller 210) and the displacement device 170 receives the electrical or thermal signal, thereby displacing the outer race 161 along the axial direction A to close the gap 140 between the race 161, 162 and the rolling bearing element 163, such as depicted in regard to FIG. 2B. For example, the effort supply system 200 may generate and transmit the signal to displace the outer race 161 when the engine operating condition is greater than the minimum steady state operating condition and less than the full load operating condition, such as exemplified in time portion 620 of the graph 600.

In one embodiment, the displacement device 170 may define a first displacement device 171 disposed on a first side of the race (e.g., outer race 161) along the axial direction A. The displacement device 170 may further define a second displacement device 172 disposed on a second side of the race (e.g., the outer race 161) along the axial direction A opposite of the first side. The first displacement device 171 may define a shape memory alloy and/or piezoelectric material to compress when the signal is received. The second displacement device 172 may define a spring or actuator configured to apply a load along a second load direction 182 opposite of a first load direction 181 along the axial direction A. The second load direction 182 may generally define a direction opposite of the thrust load generated by the rotor assembly 90, such as depicted by arrows 181. As such, the first displacement device 171 may contract or compress along the axial direction A, or generally become softer, such as to enable the second displacement device 172 to apply a force or load along the second load direction 182 such as to shift or displace the outer race 161 along the second load direction 182 opposite of the first load direction 181 (depicted in FIG. 2C).

Figure 2B:
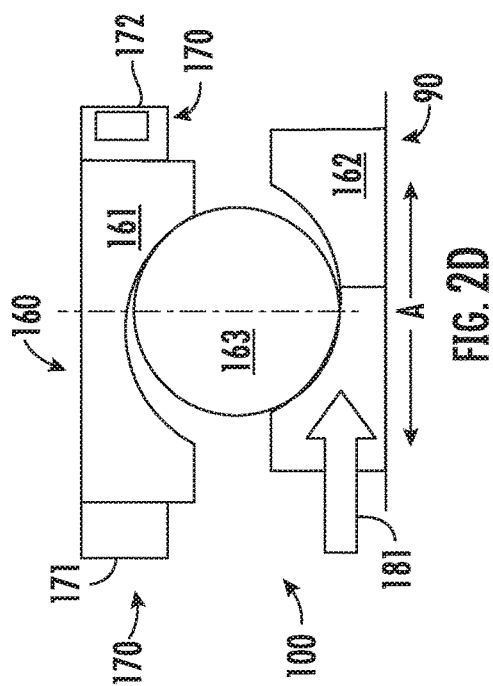

Referring still to FIG. 2B, the system 100 may be configured to provide the signal to the first displacement device 171. The second displacement device 172 may generally define a spring or actuator disposed adjacent to one or more of the inner race 162 or the outer race 161 (e.g., depicted in FIG. 2-3) of the bearing assembly 160. The second displacement device 172 defining the spring or actuator is disposed on a second side of the race 161, 162 opposite of the first displacement device 171.

Figure 2C:
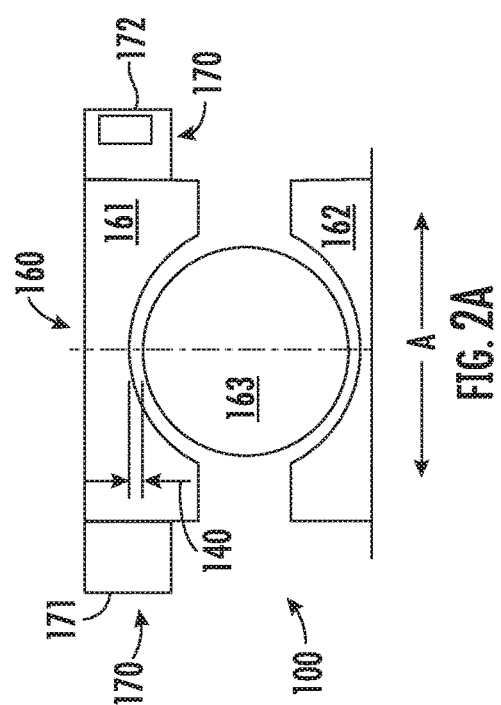

Referring now to FIG. 2C, as the engine 10 operates to increase rotational speed of the rotor assembly 90 greater than zero RPM, the engine 10 generally generates thrust such as along the first load direction 181 opposite of the second load direction 182 along which the second displacement device 172 is loading or displacing the outer race 162.

Figure 2D:
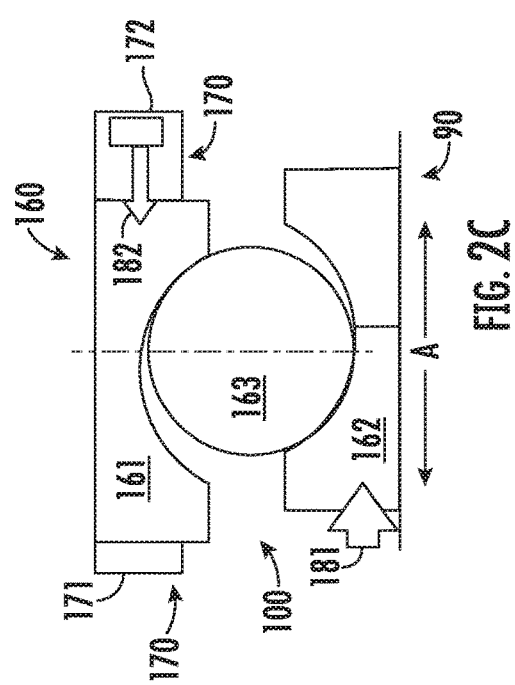

Referring now to FIG. 2D, when the engine 10 is at or above a sufficient threshold thrust output, such as depicted at 607 in the graph 600 (FIG. 6), and generally at time portion 630 between the maximum or full load condition 605 and the threshold thrust output 607, the rolling bearing element 163 may be sufficiently loaded or engaged to the outer race 161 and the inner race 162 such as to disable applying additional load or force from the second displacement device 172, or disable compressing or contracting the first displacement device 171, or both. For example, in various embodiments, the first displacement device 171 and the second displacement device 172 may each define a substantially equal thermal input from the effort supply system 200.

Referring now to FIGS. 3A-3D, in various embodiments the system 100 may operate to improve loading or engagement of the races 161, 162 to the rolling bearing element 163 during a thrust crossover event, such as to mitigate or eliminate formation of NSV. Referring to FIG. 3A, the first displacement device 171 and the second displacement device 172 may each be substantially balanced during operation of the engine 10, such as shown and described in regard to FIG. 2D.

Referring to FIG. 3B, anticipating thrust crossover, such as via a commanded change in speed of the rotor assembly 90 (e.g., deceleration) to the controller 210 (FIG. 1), a relative thrust loading between the outer race 161 and the inner race 162 may be approximately zero. For example, referring to FIGS. 3B-3D and FIG. 6, the thrust loading along the first load direction 181 at rotor assembly 90 may generally be toward a first end 98 (e.g., a downstream end of the engine 10), such as corresponding to a change in speed or thrust output depicted along line 615, such as from increasing to decreasing, or from decreasing to increasing. During or following thrust crossover, the thrust loading along the first load direction 181 at the rotor assembly 90 may generally be toward a second end 99 (e.g., an upstream end of the engine 10) opposite of the first end 98. Based at least on a commanded change in speed of the rotor assembly 90 such as to induce thrust crossover, the effort supply system 200, may apply the signal to the first displacement device 171 such as to contract or compress or otherwise soften the first displacement device 171 to enable the second displacement device 172 to load or otherwise displace the outer race 161 along the axial direction A along the second load direction 182 such as to provide engagement or loading of the outer race 161 onto the rolling bearing element 163 throughout the thrust crossover event, such as generally depicted in regard to FIG. 3C.

Referring to FIG. 3D, the thrust crossover event may generally be completely along the first load direction 181 toward the second end 99. In various embodiments, the thrust crossover event may generally be defined at one or more rotor speeds greater than zero RPM and less than a full load or 100% speed operation. For example, in one embodiment, the thrust crossover event may be defined above a minimum steady state operating condition (e.g., above ground idle or approximately 30% maximum rotor speed). As another example, the thrust crossover event may be defined below a maximum steady state operating condition or 100% speed operation. In still another example, the thrust crossover event may be defined below approximately 85% maximum rotor speed or a cruise condition of the engine 10.

Figure 4:
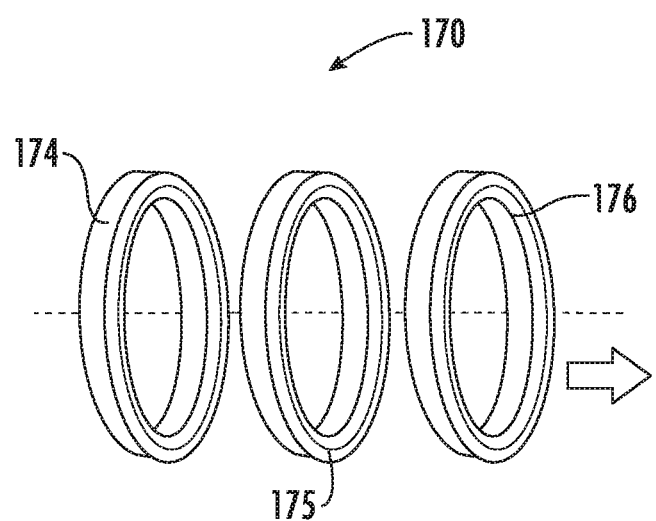
FIG. 4 is an exploded view of a portion of the system for controlling stiffness according to an aspect of the present disclosure.
Figure 5:
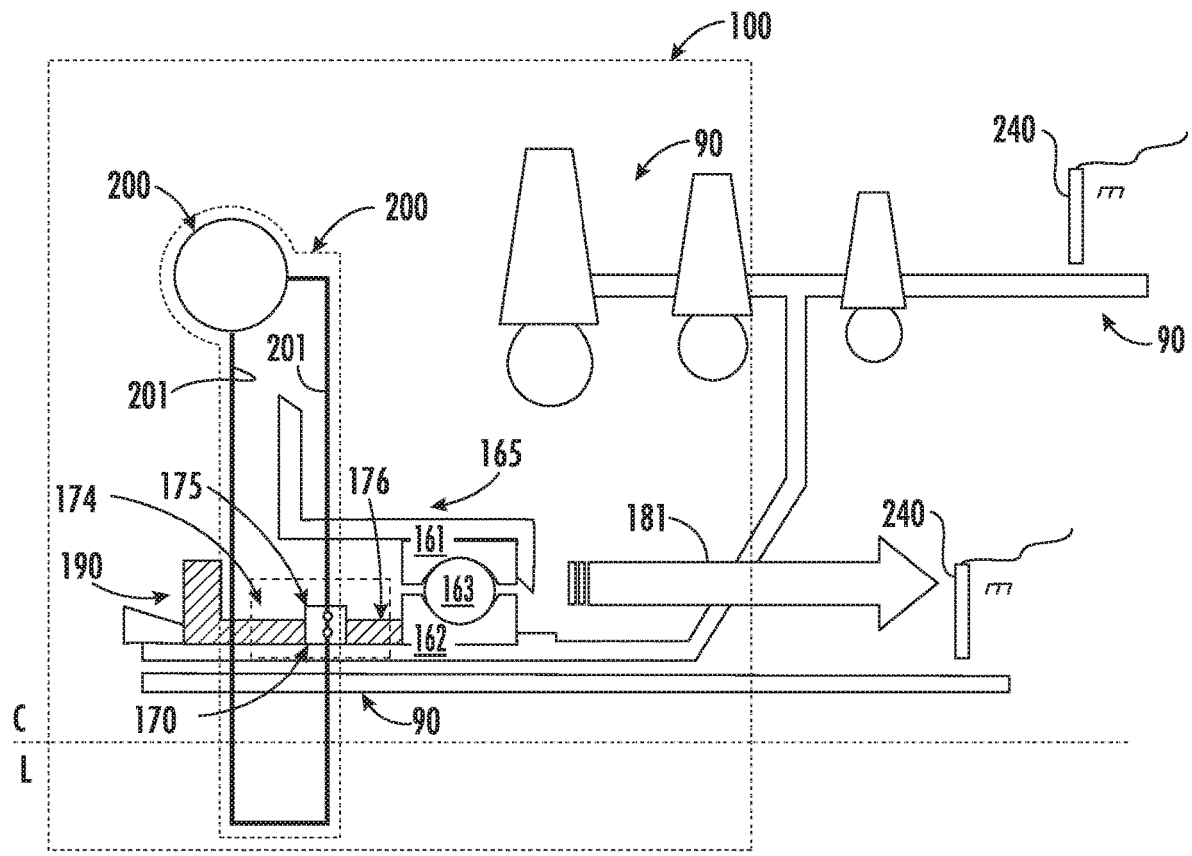
FIG. 5 is a schematic cross sectional view of a bearing assembly of a turbo machine according to an aspect of the present disclosure.

Referring now to FIG. 4, the displacement device 170 may define a substantially cylindrical body. The displacement device 170 may further include a piezoelectric element 175 disposed between a first spacer 174 and a second spacer 176. Referring to FIGS. 4-5, the first spacer 174 may generally be adjacent to a gear 190 configured to receive motive force from a starter unit (not shown). The start unit provides the motive force to generate rotation of the rotor assembly 90 from rest or zero RPM via an accessory gear assembly.

Referring still to FIG. 5, in conjunction with FIG. 1, as described above, the engine 10 may include one or more sensors 240 configured to acquire, measure, calculate, and/or transmit an operational parameter of the engine 10. The controller 210 receives the operational parameter indicating a relatively low thrust at the bearing assembly 160. In various embodiments, the low thrust indication may include a load or thrust measurement (e.g., a strain gage or load cell), a measurement or calculation via vibrations (e.g., an accelerometer, proximity probe, non-interference structural measurement system, etc.), or a pre-determined commanded rotor speed, rotor speed change, fuel or air flow rate or rate of change, etc. further corresponding to a thrust loading at the bearing assembly 160. The controller 210 provides the signal to the displacement device 170 such as to generate loading at the race 161, 162 (e.g., inner race 162 as depicted in FIG. 5). The generated loading at the race 161, 162 onto the rolling bearing element 163 further mitigates or eliminates a gap 140 (FIG. 2A). The generated loading thereby modifies critical frequency at the rotor assembly 90 such as to avoid excitation frequency during BRS. Additionally, or alternatively, the generated loading further ensures the rolling bearing element 163 is sufficiently loaded such as to produce or maintain stiffness (e.g., radial stiffness) to mitigate or eliminate NSV.

Figure 7:
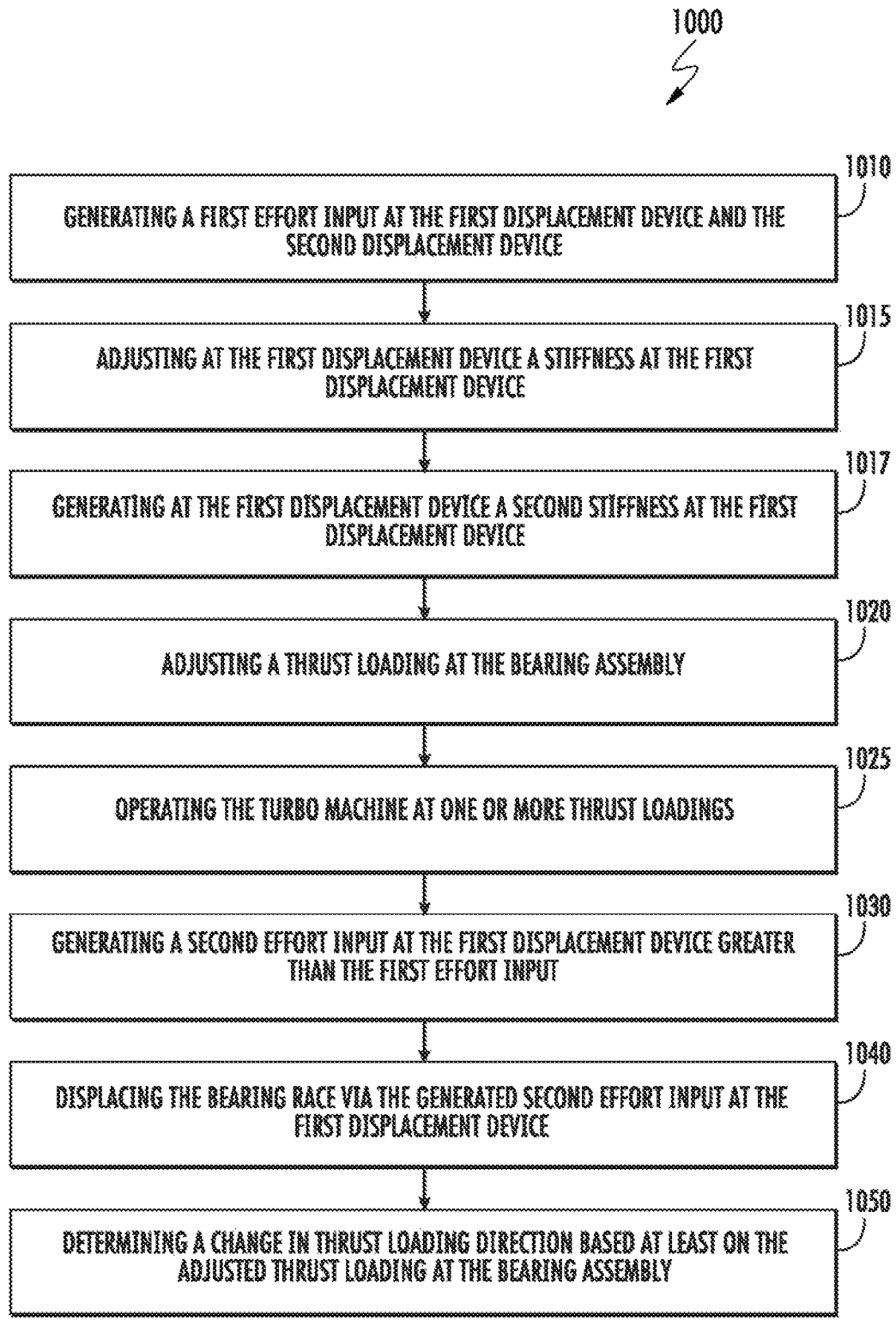
FIG. 7 is a flowchart outlining exemplary steps of a method for mitigating undesired vibrations at a turbo machine.

Referring now to FIG. 7, a flowchart outlining exemplary steps of a method for mitigating or eliminating bowed rotor (BRS) and/or non-synchronous vibrations (NSV) is generally provided (hereinafter, "method 1000"). The method 1000 may be implemented or executed via embodiments of the system 100 generally shown and provided in regard to FIGS. 1-6. The method 1000 may be further implemented or executed via a turbo machine generally, including, but not limited to, embodiments of the turbo machine shown and described in regard to FIG. 1.

The method 1000 includes at 1010 generating, via the effort supply system, a first effort input at the first displacement device and the second displacement device. In various embodiments, such as shown and described in regard to FIGS. 2-6, the first effort input includes one or more of an electrical charge and/or a thermal energy input. The thermal energy input may include providing heat via a fluid, such as, but not limited to, a lubricant, fuel, air, or another liquid or gas, or combinations thereof.

The method 1000 further includes at 1020 adjusting, via the turbo machine, a thrust loading at the bearing assembly. Adjusting the thrust loading includes commanding a change in fuel and/or air flow rate, pressure, etc. to the combustion chamber (e.g., at the combustion section 26 in FIG. 1) to change acceleration at the rotor assembly 90, thereby changing thrust loading at the bearing assembly 160. The method 1000 may further include at 1025 operating the turbo machine at one or more thrust loadings corresponding to a rotor speed greater than or equal to a minimum steady state condition and less than a maximum steady state condition, such as described in regard to FIGS. 2-6.

The method 1000 further includes at 1030 generating, via the effort supply system, a second effort input at the first displacement device greater than the first effort input. For example, the method 1000 at 1030 may include increasing thermal energy input or thermal loading at the first displacement device 171 such as to compress, contract, or other enable the second displacement device 172 to load the bearing race 161, 162 onto the rolling bearing element 163. In various embodiments, loading the bearing race more specifically includes loading the outer race 161 along the second load direction 182 opposite of the first load direction 181 of the thrust loading. As such, the method 1000 further includes at 1040 displacing the bearing race along the axial direction opposite of the thrust loading at the bearing assembly via the generated second effort input at the first displacement device.

In various embodiments at 1040, displacing the outer race 161 or the inner race 162 along the axial direction A such that the race 161, 162 contacts the rolling bearing element 163 along the axial direction A along the thrust loading and the axial direction A opposite of the thrust loading, respectively. For example, displacing the outer race 161 may generally be along the axial direction A opposite of the thrust loading (e.g., the outer race 161 receives a loading along the second load direction 182 opposite of the thrust loading direction along the first load direction 181 such as described in regard to FIGS. 2-6). As another example, displacing the inner race 162 may be generally along the axial direction A along the direction of the thrust loading along the first load direction 181 such as to enable engagement of the races 161, 162 to the rolling bearing element 163.

The method 1000 may further include at 1050 determining a change in thrust loading direction based at least on the adjusted thrust loading at the bearing assembly. For example, determining the change in thrust loading direction (e.g., from the first end 98 to the second end 99 in regard to FIGS. 3B-3D) may generally define a thrust crossover event. As another example, the change in thrust loading direction may include decelerating the speed of the rotor assembly 90 at the turbo machine (e.g., reducing a fuel and/or air flow, pressure, etc. to the combustion section 26). In one embodiment at 1030, generating the second effort input at the first displacement device is based at least on the determined change in thrust loading.

The method 1000 may further include at 1015 adjusting at the first displacement device, via the effort supply system, a stiffness at the first displacement device (e.g., first displacement device 171, such as shown and described in regard to FIGS. 2-5). In still another embodiment, the method 1000 may further include at 1017 generating at the first displacement device, via the second effort input provided from the effort supply system, a second stiffness at the first displacement device different from a first stiffness at the first displacement device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for bearing engagement at a turbo machine, the system comprising:
    a bearing assembly comprising an inner race, an outer race, and a rolling bearing element therebetween;
    a first displacement device; and
    a second displacement device,
    wherein the first displacement device is disposed adjacent to a first axial side of the inner race of the bearing assembly and the second displacement device is disposed adjacent to a second axial side of the inner race of the bearing assembly, or the first displacement device is disposed adjacent to a first axial side of the outer race of the bearing assembly and the second displacement device is disposed adjacent to a second axial side of the outer race of the bearing assembly, and
    wherein each of the first and second displacement devices is configured to displace the outer race along an axial direction, or each of the first and second displacement devices is configured to displace the inner race along the axial direction.

2. The system of claim 1, wherein the first displacement device comprises a shape memory alloy material.

3. The system of claim 2, wherein the first displacement device comprises the shape memory alloy defining a two-way memory effect.

4. The system of claim 1, wherein the first displacement device comprises a piezoelectric material.

5. The system of claim 1, wherein the first displacement device, the second displacement device, or both the first and second displacement devices defines a substantially cylindrical body adjacent to one or more of the inner race or the outer race of the bearing assembly.

6. The system of claim 1,
    wherein the second displacement device comprises a spring.

7. The system of claim 1,
    wherein the axial direction is co-linear to a thrust load path of the turbo machine.

8. The system of claim 1, the system further comprising:
    an effort supply system disposed adjacent to the first displacement device, the second displacement device, or both, and
    wherein the effort supply system provides an electrical signal or a thermal input to the first displacement device, the second displacement device, or both.

9. The system of claim 8, wherein the effort supply system defines a slip ring providing the electrical signal to the first displacement device, the second displacement device, or both.

10. The system of claim 8, wherein the effort supply system defines a lubricant system providing the thermal input defining a lubricant to the first displacement device, the second displacement device, or both.

11. A system for operating a turbo machine to maintain bearing engagement, the system comprising:
    a bearing assembly comprising an inner race, an outer race, and a rolling bearing element therebetween;
    a first displacement device disposed adjacent to one or more of the inner race or the outer race of the bearing assembly, wherein the first displacement device displaces the outer race or the inner race along an axial direction;
    a second displacement device disposed adjacent to one or more of the inner race or the outer race of the bearing assembly opposite of the first displacement device along the axial direction, wherein the first displacement device displaces the outer race or the inner race along the axial direction opposite of the first displacement device;
    an effort supply system disposed adjacent to one or more of the first displacement device or the second displacement device, wherein the effort supply system is configured to provide an electrical signal or a thermal input to the first displacement device or second displacement device;
    a sensor configured to acquire and transmit an operational parameter of the bearing assembly; and
    one or more controllers configured to perform operations, the operations comprising:
        generating, via the effort supply system, a first effort input at the first displacement device or the second displacement device;
        adjusting, via the turbo machine, a thrust loading at the bearing assembly;
        generating, via the effort supply system, a second effort input at the first displacement device greater than the first effort input; and displacing the outer race or the inner race along the axial direction opposite of the thrust loading at the bearing assembly via the generated second effort input at the first displacement device.

12. The system of claim 11, the operations further comprising:
operating the turbo machine at one or more thrust loadings corresponding to a rotor speed greater than or equal to a minimum steady state condition and less than a maximum steady state condition.

13. The system of claim 11, the operations further comprising:
determining a change in thrust loading direction based at least on the adjusted thrust loading at the bearing assembly.

14. The system of claim 13, wherein generating the second effort input at the first displacement device is based at least on the determined change in thrust loading.

15. The system of claim 11, the operations further comprising:
adjusting at the first displacement device, via the effort supply system, a stiffness at the first displacement device.

16. The system of claim 15, the operations further comprising:
generating at the first displacement device, via the second effort input provided from the effort supply system, a second stiffness at the first displacement device different from a first stiffness at the first displacement device greater.

17. A method for mitigating undesired vibrations at a turbo machine, the method comprising:
generating a first effort input at a first displacement device and a second displacement device adjacent to a bearing assembly;
adjusting a thrust loading at the bearing assembly;
generating a second effort input at the first displacement device greater than the first effort input; and
displacing an outer race or an inner race along an axial direction opposite of the thrust loading at the bearing assembly via the generated second effort input at the first displacement device.

18. The method of claim 17, the method further comprising:
adjusting at the first displacement device a stiffness at the first displacement device.

19. The method of claim 18, the method further comprising:
generating at the first displacement device a second stiffness at the first displacement device different from a first stiffness at the first displacement device greater.

20. The method of claim 17, the method further comprising:
determining a change in thrust loading direction based at least on the adjusted thrust loading at the bearing assembly.

* * * * *